Figure 1:
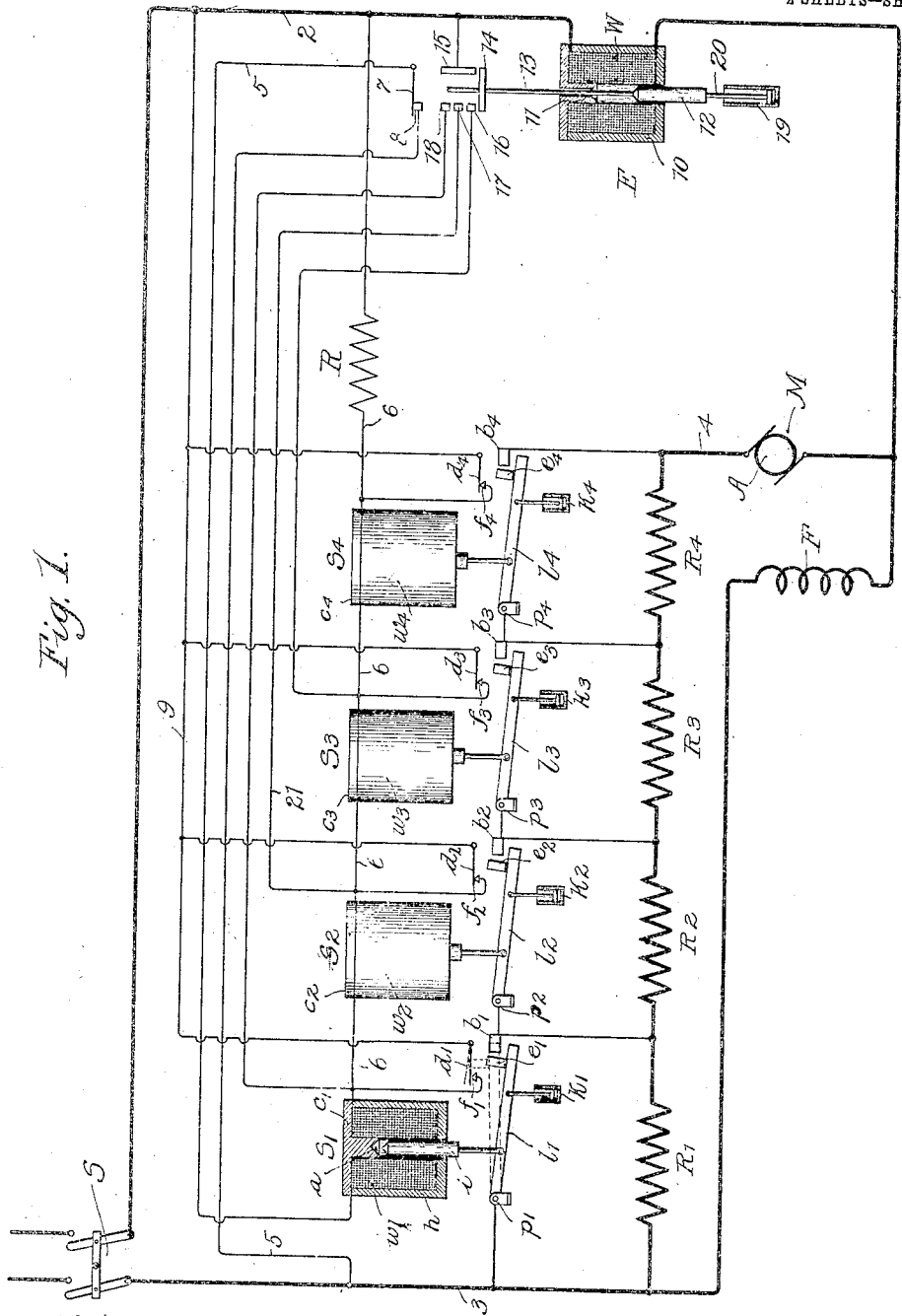

D. C. JACKSON.
ELECTRIC MOTOR CONTROL.
APPLICATION FILED APR. 14, 1906.

923,973.

Patented June 8, 1909.
2 SHEETS—SHEET 1.

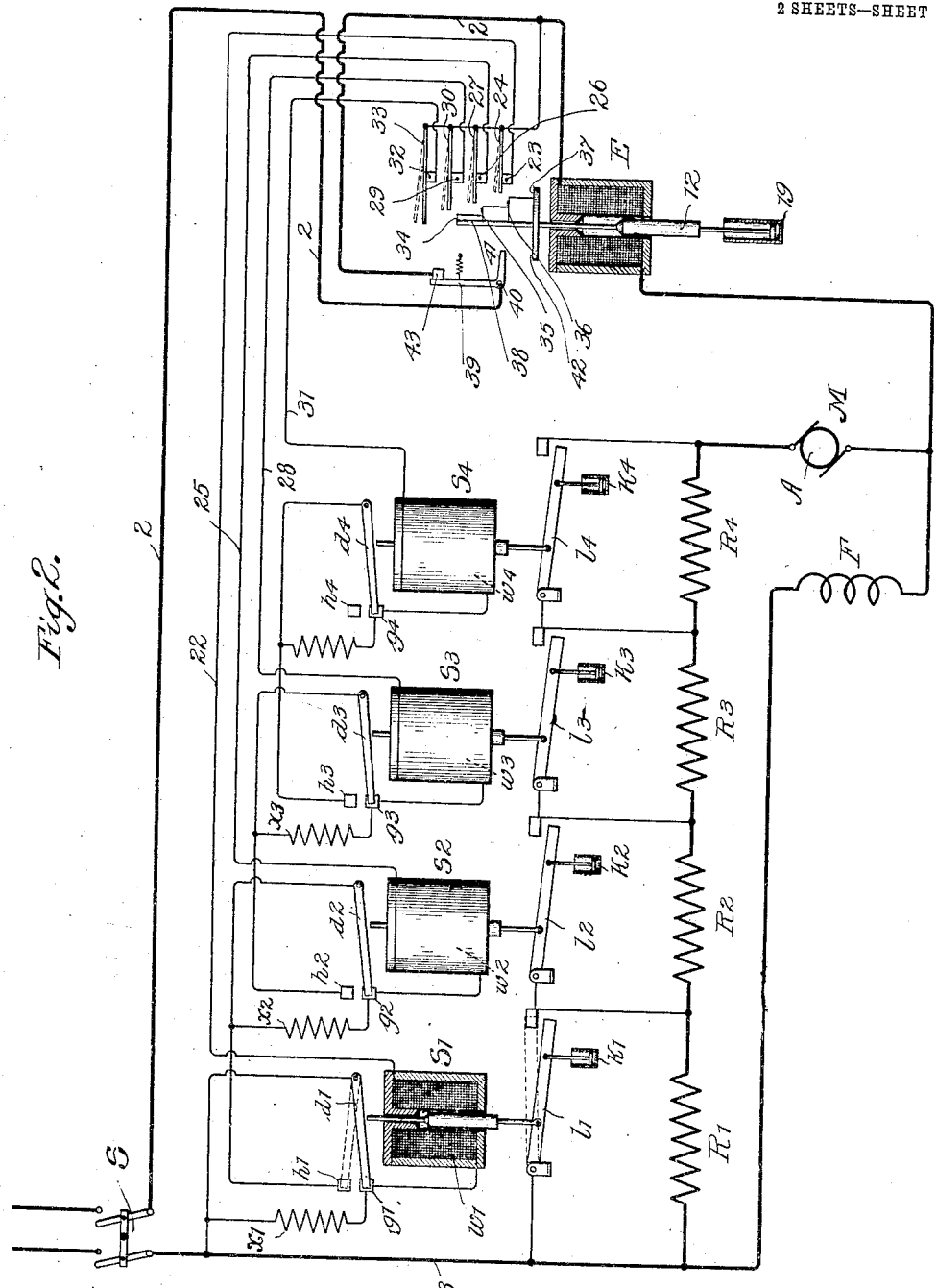

UNITED STATES PATENT OFFICE.

DUGALD C. JACKSON, OF MADISON, WISCONSIN, ASSIGNOR TO DUGALD C. JACKSON AND WILLIAM B. JACKSON, OF MADISON, WISCONSIN, A COPARTNERSHIP.

ELECTRIC-MOTOR CONTROL.

No. 923,973.      Specification of Letters Patent.      Patented June 8, 1909.

Application filed April 14, 1906. Serial No. 311,641.

*To all whom it may concern:*

Be it known that I, DUGALD C. JACKSON, citizen of the United States, residing at Madison, in the county of Dane and State of Wisconsin, have invented a certain new and useful Improvement in Electric-Motor Control, of which the following is a full, clear, concise, and exact description, reference being had to the accompanying drawings, forming a part of this specification.

My invention relates to the operation and protection of electric translating devices, and particularly to the operation and protection of electric motors during the starting period. My invention relates to that type of arrangements in which a starting rheostat is divided into various sections, each section being controlled by an electromagnetic switch so operated that the sections are successively rendered ineffective after the main switch for the motor circuit has been closed. The electromagnetic switches which severally control the sections of the starting rheostat are connected in suitable relation with the main circuit, the arrangement being such that the switch electromagnets, with the exception of the first one, are not energized until after the first one has performed its function of removing the corresponding rheostat section from the circuit of the motor armature. Each electromagnetic switching mechanism controls the circuit condition of the magnet in the following mechanism, and as each mechanism becomes effective to remove its rheostat section from circuit, the magnet in the following mechanism is energized and in turn becomes effective to remove its rheostat section from circuit, and so on until all of the rheostat has been removed from circuit and the motor connected directly with the main circuit.

The invention particularly relates to means for preventing the mechanisms from introducing current into the motor too rapidly, so that the motor may be allowed to normally accelerate its load without an excessive starting current; and the means for producing this desired result include devices for automatically checking the actuation of the electromagnetic mechanisms or for restoring them to their normal condition in reverse order (if the current flow becomes excessive during the process of starting the motor) until the current returns to a suitable value, and then permitting the normal starting procedure to continue. Protection against excessive currents is also afforded after the motor has been started.

Various arrangements and devices may be employed for carrying out my invention, and in the accompanying drawings I illustrate two arrangements.

Figure 1 shows an arrangement in which the various electromagnets for the switching mechanisms are adapted to be included serially in circuit and may be successively short circuited by additional electromagnetic switching mechanism, controlled by the amount of current flowing through the circuit, in case of excessive current flow in the motor circuit. Fig. 2 shows an arrangement in which the various switch electromagnets are included individually in bridge of the line, the additional electromagnetic switching mechanism being adapted to open the individual electromagnet circuits when the current in the motor circuit exceeds a predetermined value.

The motor M is shown as a shunt wound motor, and the main switch S serves when closed to connect the field F of the motor directly with the supply circuit 1 through the conductors 2 and 3, and to connect the armature A of the motor with the supply circuit through the conductors 2 and 4, the conductor 4 initially including the resistance sections $R^1$, $R^2$, $R^3$ and $R^4$ of the starting resistance, and the conductor 2 includes the winding W of the electromagnetic switch controlling mechanism E. Associated with the resistance sections $R^1$, $R^2$, $R^3$ and $R^4$, respectively, are electromagnetic mechanisms $S^1$, $S^2$, $S^3$ and $S^4$, respectively, whose windings $w^1$, $w^2$, $w^3$ and $w^4$ are connected serially together and with the main line limbs through the conductors 5 and 6, the conductor 5 normally including the switch arm 7 and contact part 8, this arrangement being that shown in Fig. 1. The electromagnetic mechanisms may be made up in any desired manner, but, as illustrated, the winding thereof is surrounded by an iron sheath $h$, and a plunger or core $i$ is adapted for reciprocation within the winding. Each electromagnet may have a cap $c$ having a conical recess $a$ into which the conical end of the core $i$ engages upon attraction thereof, and when the core is in this position the magnets are capable of maintaining the switch mechanism in proper position with much less current than was necessary to at first move the core and switch mechanisms into the proper position. The switch levers $l^1$, $l^2$, $l^3$ and $l^4$ are provided for the respective electromagnets and pivoted at an intermediary point to the cores thereof, each lever being pivoted at one end $p$ and connected with one terminal of the corresponding resistance section, while the free end of the lever is adapted for engagement with a contact part designated by the letters $b$, which contact part is connected with the pivot point of the lever of the following electromagnet and also with the adjacent terminals of the corresponding resistance sections.

Near the free end of each lever is a tongue designated by the letters $e$, being insulated from the arm and adapted upon movement of the arm by the electromagnet to engage a switch lever designated by the letters $d$ which normally engages a contact anvil designated by the letters $f$, the lever arm $d$ being moved away from the corresponding anvil $f$ upon upward movement of the lever $l$. Each of the contact anvils $f$ is connected with the conductor 6 including the electromagnets, while the arms $d$ are connected with the common conductor 9 connecting with the main line limb 2, and a short circuit is closed about the electromagnets that follow the first electromagnet $S^1$.

The operation of the system thus far is as follows: Upon closure of the switch S current flows to the line limb 3 and normally flows through three paths, to the conductor 2 back to the main switch. One path leads through the field F. The other path includes all the resistance sections $R^1$, $R^2$, $R^3$ and $R^4$ and the armature A in series. And the third path includes conductor 5, switch 7 and winding $w^1$, of electromagnet $S^1$ which is connected directly to the line limb 2 through the normally closed switch $d^1$ and $f^1$, this direct path preventing energizing current from flowing through the following relays. The motor is now in condition to start, and electromagnet $S^1$ becoming energized causes engagement of the lever $l^1$ with the contact part $b^1$ to short circuit the resistance section $R^1$ and allows the motor armature to accelerate its speed. At the same time also the switch arm $d^1$ is raised from the anvil $f^1$ and the current flow is extended to the second electromagnet $S^2$ and from there through the switch parts $d^2$ and $f^2$ to the conductor 9 and limb 2. This second electromagnet in turn becomes energized and its switch arm $l^2$ actuated to short circuit the section $R^2$ from the armature circuit, at the same time disengaging switch parts $d^2$ and $f^2$ to extend the current flow to the third electromagnet, and so on until all the resistance sections have been short circuited and the armature connected directly in circuit through the various switch arms. Owing to the magnetic circuit arrangement of the electromagnets, as described, less current will be required to hold the cores in an actuated position than to move them to such position, and a resistance R may, therefore, be included in the electromagnet circuit to allow just enough current to continuously flow therethrough to maintain proper control of the switching parts, and this resistance may normally be short circuited from circuit by the switch parts $d^4$, $f^4$ controlled by the switch lever $l^4$. Mechanisms such as the dash pots $h$ may be suitably arranged and adjusted to retard the movement of the switch levers $l$ to any desired degree, as they are attracted by the connected core.

There may be times during the starting of the motor when the controlling mechanisms may operate to introduce the current into the motor too rapidly, or during the operation of the motor after starting, the current flow may suddenly become excessive, and the additional electromagnetic controlling mechanism E is provided to readjust the circuit conditions under these circumstances to reduce the current to a safe value. This additional electromagnetic mechanism comprises the winding W surrounded by the magnetic shell 10 having a stationary core part 11 to be engaged by the core 12 after attraction thereof, whereby less current is required to hold the core than to cause its motion. The upper stem 13 from the core carries a switch blade 14 for engaging at one end with a contact strip 15 connected with the limb 2 and at the other end adapted for engaging successively with the contact plates 16, 17 and 18 connected respectively with the contact anvils $f^3$, $f^2$ and $f^1$ of the electromagnetic switching mechanism. At the end of the upward movement of the core 12, the stem 13 engages the switch arm 7 to raise this arm from the contact part 8 which is connected with the limb 3. A dash pot 19 is connected with the lower stem 20 of the core and is adjusted to suitably retard the upward movement of the core but to allow a quick return thereof. The winding W and associated parts are of such dimensions that there will be no upward movements of the core 12 when the current through the motor is within a predetermined maximum value, but when the current exceeds this maximum value the core will begin to move upwardly.

Suppose that the motor is overloaded or something is wrong so that it does not start properly and the current becomes too great upon the short circuiting of any one of the rheostat sections. The current through the winding W of the electromagnetic mechanism E is then strong enough to cause an upward attraction of the core 12. If, for instance, upon starting the motor the current became excessive when resistance section R³ was removed, the contact blade 14 would move upward until, coming into engagement with the contact plate 17, the current would be withdrawn from the electromagnet S³ and diverted through the short circuiting path including the conductor 21, contact plate 17, contact arm 14 and contact plate 15 to limb 2, and this electromagnet becomes deënergized and the resistance section R³ again included in circuit. If the current is sufficiently reduced, the core 12 is released and the short circuit paths removed from the electromagnet S³ which again performs its function to cut the resistance from circuit. The electromagnetic mechanism E remains active while the current exceeds a certain predetermined value, and short circuits only a sufficient number of electromagnets to restore the current to a safe value. The armature on the motor is thus given time to overcome the inertia of the load and it is brought to appropriate speed without injurious effects. The motor is thus protected without interfering with the process of starting except that the process is forcibly delayed to a suitable degree for the purpose of affording the motor time to overcome the inertia of its load.

It will be noticed that the electromagnetic mechanisms are rendered ineffective one at a time in reverse order, if the armature current becomes excessive during the process of starting the motor, until the current returns to a suitable value, and the normal procedure of controlling the rheostat resistance sections then continues from the switch last opened. Thus, the system is at all times kept in perfect balance. Even after the motor has been started and is running, excessive current flow may cause sufficient actuation of the electromagnetic mechanism E to control a sufficient number of electromagnetic switches until the current is restored to normal value.

In Fig. 2, the arrangement is slightly different from that shown in Fig. 1. Instead of being connected to be serially included in the controlling circuit, the electromagnetic mechanisms S¹, S², S³, and S⁴ are adapted to be connected separately in bridge of the line limbs, such connection of each mechanism being controlled by the preceding mechanism. Also, instead of short circuiting the mechanisms, the electromagnetic mechanism E is adapted for opening the various energizing circuits to render the mechanisms ineffective. The switch arms $l^1$, $l^2$, $l^3$ and $l^4$ are connected, as in Fig. 1, to short circuit the corresponding rheostat sections $R^1$, $R^2$, $R^3$ and $R^4$ upon attraction of the corresponding electromagnetic cores. The arms $d^1$, $d^2$, $d^3$ and $d^4$ are pivoted above the electromagnets to be engaged by a stem from the upper end of the core and thereby to be moved from a normal position of engagement with the contact parts $g^1$, $g^2$, $g^3$ and $g^4$ to an alternate position of engagement with the contact parts $h^1$, $h^2$, $h^3$ and $h^4$. The contact part $g^1$ of the electromagnetic mechanism S¹ is connected with one terminal of the winding $w^1$, and through a resistance device $x^1$ with the line limb 3, and the switch lever $d^1$ normally also connects with the line limb 3. The alternate contact part $h^1$ connects with the switch lever $d^2$ of the following controlling mechanism and also connects through a resistance device $x^2$ with the normal contact part $g^2$ and with a terminal of the winding $w^2$ of this following mechanism. The alternate contact part $h^2$ connects with the switch lever $d^3$ and through resistance device $x^3$ with the normal contact part $g^3$ and a terminal of the winding $w^3$ of the next following electromagnetic mechanism, and so on throughout any number thereof. The other terminal of the winding $w^1$ connects through conductor 22 with the contact part 23 over which is arranged the contact arm 24 connected with the limb 2. The other terminal of winding $w^2$ connects through conductor 25 with the contact part 26 over which is arranged the contact arm 27 connected with line limb 2. The other terminal of winding $w^3$ connects through conductor 28 and through contact part 29 and arm 30 with the limb 2, while the other terminal of winding $w^4$ connects through conductor 31, through contact part 32 and arm 33 with line limb 2, and so on throughout the series of electromagnetic mechanisms.

Various mechanical arrangements may be devised for disengaging the arms 24, 27, 30 and 33 from their associated contact parts at proper times, and I have diagrammatically shown certain means for accomplishing this. The ends of the arms, as shown, are arranged to be engaged by the steps 34, 35, 36 and 37 carried by the stem 38 extending from the core 12 and so arranged that, upon attraction of the core, the arm 33 will be first engaged and disconnected from its contact part 32 associated with the last electromagnetic mechanism S⁴, and the arms 30, 27 and 24 will be successively engaged by the steps 35, 36 and 37, respectively, if the core 12 continues to rise. An arrangement may be provided for opening the main circuit after opening all of the circuits for the electromagnetic mechanisms, and I have shown a circuit-breaker switch arm 39 pivoted at 40 and having an arm 41 disposed in the path of the step 42, to be engaged by this step and disengaged from its normal contact at 43, thereby to open the line limb 2 and thus the main circuit.

Under normal conditions in this system, upon closure of the main switch S the current passes from the limb 3 to the limb 2 through three paths, one containing the field winding F, another including all the rheostat sections and the armature A, and the third path including the switch lever $d^1$, contact part $g^1$, winding $w^1$, conductor 22, contact part 23 and arm 24. The electromagnet $S^1$ becomes energized and causes movement of the arm $l^1$ to short circuit the corresponding rheostat section $R^1$ and the arm $d^1$ is moved from contact with $g^1$ to make contact with $h^1$. The resistance coil $x^1$ is now included in circuit with the winding $w^1$, as less current is needed to maintain the core of $S^1$ in its actuated position. Upon engagement of this arm $d^1$ in contact with $g^1$, current also flows from the limb 3 directly to the arm $d^2$ of the next controlling mechanism and from contact part $g^2$ to winding $w^2$, conductor 25, contact part 26 and arm 27 to the limb 2. Resistance section $R^2$ then becomes short circuited and arm $d^2$ moved into engagement with $h^2$ to allow current to flow to the next electromagnet, and resistance device $x^2$ is included in circuit with one winding $w^2$ to reduce the current flow after actuation of the mechanism. The electromagnetic mechanisms $S^3$ and $S^4$ are similarly controlled in successive order, until all the resistance sections of the main rheostat are short circuited and the armature connected directly with the main circuit. The movement of the arms $l^1$, $l^2$, $l^3$ and $l^4$ may be modified by retarding mechanism such as dash pot arrangements $k$, and the movements of the core 12 may be modified by a dash pot arrangement 19 adjusted to retard the upward movement of the core but to allow quick return thereof.

If during the course of these operations to stop the motor the current should become excessive and beyond the fixed maximum the electromagnetic mechanism E becomes effective and the core 12 and switch actuating steps are carried upwardly to successively open the various switches and circuits through the controlling mechanism windings, this deenergizes the controlling mechanism in reverse order to maintain the balance of the system. If the current very shortly again assumes a safe value, the core 12 is released and the normal starting procedure continues until the motor is connected directly with the supply circuit. As the core is attracted upwardly, the step 34 and arm 33 are first brought into engagement and the arm disconnected from its contact with 32 to thereby open the circuit through the winding $w^4$ of the last controlling mechanism. If the core continues to move upwardly, the step 35 disengages arm 30 from its contact with 29 and the circuit through winding $w^3$ is opened. And thus the various mechanisms are rendered ineffective one by one in reverse order to reinclude the rheostat sections in circuit. If the current persistently remains abnormal this will continue until all the rheostat sections are again included in circuit, and the core 12 finally is wholly attracted and the main circuit opened upon engagement of the step 42 with the extension 41 and consequent opening of the switches 39, 43.

Under the system of controlling herein described and illustrated the motor is at all times under protection against excessive current flow and this protection is particularly afforded during the starting period when the dangers from overload and excessive current flow are greatest. The protection operates without interference with the process of starting, the process being merely held in check or delayed for a suitable period to give the motor time to over come the inertia of its load and to allow the current flow to assume a safe value. The system is at all times maintained in perfect balance at any stage of the operation and is entirely automatic.

As changes in the arrangement of the apparatus and circuits may readily be made without departing from the spirit of my invention, I do not wish to be limited to those described, but

I claim as new and desire to secure by Letters Patent:

1. The combination of a plurality of electromagnets, circuits therefor for connecting said magnets with a main circuit, one of said magnets being energized upon closing a switch in the main circuit, means controlled by the magnets after energization of the first magnet whereby said magnets are successively connected with the main circuit, and controlling means for causing disconnection of said electromagnets in reverse order.

2. The combination of a plurality of electromagnets, circuits therefor for connecting said magnets with a main circuit, one of said magnets being energized upon closing a switch in the main circuit, means controlled by the magnets after energization of the first magnet whereby said magnets are successively connected with the main circuit, and electromagnetic controlling means associated with the circuits of the electromagnets for causing successive disconnection thereof from the main circuit and in reverse order.

3. The combination of a plurality of electromagnets, circuits therefor for connecting said magnets with a main circuit, one of said magnets being energized upon closing a switch in the main circuit, means controlled by the magnets after energization of the first magnet whereby said magnets are successively connected with the main circuit, and electromagnetic mechanism controlled by the current flow through the main circuit for causing disconnection of said electromagnets from the main circuit in reverse order to that of their connection therewith.

4. The combination with a main circuit, of a plurality of electromagnets connected therewith through branch circuits and adapted upon closure of a switch in the main circuit to become successively energized from the main circuit, an electromagnetic mechanism included in the main circuit, said electromagnetic mechanism being normally ineffective and adapted upon excessive current flow through the main current to change the branch circuits to cause the electromagnets to become successively disengaged from the main circuit in a reverse order.

5. The combination with a main circuit, of a plurality of electromagnets adapted to be connected therewith through secondary circuits, each electromagnet with the exception of the first being normally rendered ineffective by mechanism controlled by the preceding electromagnet, said first electromagnet being adapted to become effective upon closure of a switch in the main circuit whereby the mechanism controlled thereby is actuated to render the second electromagnet effective and whereby each succeeding electromagnet is likewise rendered effective until all the electromagnets have become effective, and additional mechanism independent of the mechanism controlled by the electromagnets for causing said electromagnets to be rendered ineffective in reverse order.

6. The combination with a main circuit of a plurality of electromagnets adapted to be connected therewith through secondary circuits, each electromagnet with the exception of the first being normally rendered ineffective by mechanism controlled by the preceding electromagnet, said first electromagnet being adapted to become effective upon closure of a switch in the main circuit whereby the mechanism controlled thereby is actuated to render the second electromagnet effective and whereby each succeeding electromagnet is likewise rendered effective until all the electromagnets have become effective, and additional electromagnetic controlling mechanism operating independently of the mechanism controlled by the electromagnets to render the electromagnets successively ineffective in reverse order.

7. The combination with a main circuit, of a plurality of electromagnets adapted for connection therewith, a switch for connecting the main circuit with a supply source, circuit changing means controlled by each electromagnet and normally disposed to render the succeeding electromagnet ineffective, one of said electromagnets being adapted to be actuated upon closure of said switch whereby its circuit changing mechanism is actuated to cause the succeeding electromagnets and the circuit changing mechanisms controlled thereby to be successively actuated, and controlling electromagnetic mechanism and circuit changing mechanism to be actuated ereby to cause the electromagnets to again become ineffective and in reverse order.

8. The combination with a main circuit, of a plurality of electromagnets, circuit changing mechanism for each electromagnet associated with the next electromagnet to normally render all but one of said electromagnets ineffective, means upon closure of a switch in the main circuit for causing actuation of the one electromagnet whereby its circuit changing mechanism becomes actuated and the succeeding electromagnets rendered effective one by one, a controlling electromagnet, circuits controlled thereby, and circuit changing mechanism controlled by said main electromagnet and associated with the other electromagnets, actuation of said main electromagnet causing the circuit changing mechanism controlled thereby to render the electromagnets ineffective one by one and in a reverse order.

9. The combination with a main circuit, of a plurality of electromagnets, one of said electromagnets being adapted for connection with the main circuit upon closure of a main switch, the other electromagnets being normally rendered ineffective, means controlled by the electromagnets and adapted upon connection of the one electromagnet with the main line to cause effective current flow to be lead successively to the other electromagnets, and controlling electromagnetic mechanism for withdrawing the effective current flow successively from the electromagnets and in reverse order.

10. The combination with a main circuit, of a plurality of electromagnets, one of said electromagnets being adapted for connection with the main circuit upon closure of a main switch, the other electromagnets being normally rendered ineffective, means controlled by the electromagnets and adapted upon connection of the one electromagnet with the main line to cause effective current flow to be lead successively to the other electromagnets, and electromagnetic governing mechanism controlled by the current flow in the main circuit and adapted upon excessive current flow therethrough to become active to cause withdrawal of effective current flow from the electromagnets to cause said electromagnets to become ineffective in a reverse order.

11. The combination with a main circuit, of a plurality of electromagnets for connection therewith, one of which magnets may be energized upon closure of a switch in the main circuit, means controlled by the magnets to cause the magnets to be successively connected to become successively effective, means for reducing the current flow through the electromagnets after said magnets have become effective, and main electromagnetic controlling means for causing electromagnets to be rendered ineffective in a reverse order.

12. The combination with a main circuit, of a plurality of electromagnets for connection therewith, one of which magnets may be energized upon closure of a switch in the main circuit, means controlled by the magnets to cause the magnets to be successively connected to become successively effective, means for reducing the current flow through the electromagnets after said magnets have become effective, and main electromagnetic mechanism controlled by the current flow in the main circuit and adapted upon current flow by a predetermined value to become active to render the electromagnets successively ineffective in reverse order.

13. In an electric motor controlling system, the combination with a motor, of a rheostat normally all in circuit therewith, a plurality of electromagnets, each associated with a section of said rheostat, a circuit for each electromagnet controlled by the preceding electromagnet and normally rendering all the electromagnets ineffective except one thereof which is adapted for connection with the main line upon closure of a switch, connection of the one electromagnet with the main line causing actuation thereof to remove its rheostat section from the motor circuit and to cause the circuits for the following electromagnets to be successively changed to render the electromagnets successively effective whereby the rheostat sections are successively removed from the motor circuit, a main electromagnetic controlling mechanism governed by the current flow through the motor and ineffective upon normal current flow, said main electromagnetic mechanism upon current flow beyond a predetermined value causing a change in the circuit conditions of the electromagnets to render said electromagnets ineffective in succession and in reverse order.

14. The combination of a plurality of similar electromagnets, circuits therefor for connecting said magnets with a main circuit, one of said magnets being energized upon closing a switch in the main circuit, means controlled by the magnets after energization of the first magnet whereby said magnets are successively connected with the main circuit, and controlling means for causing disconnection of said electromagnets in reverse order.

15. The combination with a main circuit, of a plurality of similar electromagnets for connection therewith, one of which magnets may be energized upon closure of a switch in the main circuit, means controlled by the magnets to cause the magnets to be successively connected to become successively effective, means for reducing the current flow through the electromagnets after said magnets have become effective, and main electromagnetic controlling means for causing electromagnets to be rendered ineffective in a reverse order.

16. The combination of a plurality of similar electromagnets, circuits therefor for connecting said magnets with a main circuit, one of said magnets being energized upon closure of a switch in the main circuit, means controlled by the magnets after energization of the first magnet whereby said magnets are successively connected with the main circuit, controlling means for causing disconnection of said electromagnets in reverse order, and a translating device supplied by the main circuit, the circuit conditions for said translating device being controlled by said electromagnets.

17. The combination of a plurality of similar electromagnets, circuits therefor for connecting said magnets with a main circuit, one of said magnets being energized upon closing of a switch in the main circuit, means controlled by the magnets after energization of the first magnet whereby said magnets are successively connected with the main circuit, controlling means for causing disconnection of said electromagnets in reverse order, a translating device supplied by the main circuit, and current flow adjusting resistances for the device, said resistances being controlled by said electromagnets.

18. The combination of a main circuit, a plurality of electromagnets, one of said electromagnets being adapted for direct connection with the main circuit upon closure of a switch, the other electromagnets being successively connected each in an independent bridge of the main circuit after actuation of the first electromagnet, the connection of each electromagnet being controlled by the preceding electromagnet, and additional means for controlling the electromagnet circuits and adapted upon actuation to successively open these circuits for the electromagnets whereby said electromagnets become disconnected from circuit in reverse order to that of their connection with the circuit.

19. The combination with a main circuit, of a plurality of electromagnets normally disconnected therefrom, one of said electromagnets being adapted for direct connection in bridge of the main circuit upon closure of a switch, means controlled by the electromagnets for causing the other electromagnets to become successively connected each in an independent branch of the main circuit, and means for including a resistance in circuit with each electromagnet after connection thereof in circuit.

20. The combination with a main circuit, of a plurality of electromagnets normally disconnected therefrom, one of said electromagnets being adapted for direct connection in bridge of the main circuit upon closure of a switch, means controlled by the electromagnets for causing the other electromagnets to become successively connected each in an independent branch of the main circuit, and a normally short circuited resistance for each electromagnet adapted to be included in circuit therewith upon actuation thereof.

21. The combination with a main circuit, of a plurality of electromagnets normally disconnected therefrom, one of said electromagnets being adapted for direct connection in bridge of the main circuit upon closure of a switch, means controlled by the electromagnets for causing the other electromagnets to become successively connected each in an independent branch of the main circuit, a resistance for each electromagnet circuit, a short circuit normally about each resistance, and means controlled upon actuation of an electromagnet to open said short circuit about the corresponding resistance, whereby said resistance is included in the electromagnet circuit.

22. The combination with a main circuit, of a plurality of electromagnets normally disconnected therefrom, one of said electromagnets being adapted for direct connection in bridge of the main circuit upon closure of a switch, means controlled by the electromagnets for causing the other electromagnets to become successively connected each in an independent branch of the main circuit, and additional controlling mechanism for causing disconnection of the electromagnets from circuit in reverse order.

23. The combination with a main circuit, of a plurality of electromagnets normally disconnected therefrom, one of said electromagnets being adapted for direct connection in bridge of the main circuit upon closure of a switch, means controlled by the electromagnets for causing the other electromagnets to become successively connected each in an independent branch of the main circuit, and additional mechanism controlled by the current flow through the main circuit adapted to be actuated upon sufficient current flow to open the electromagnet circuits in an order reverse to that of their closure.

24. The combination with a main circuit, of a plurality of electromagnets normally disconnected therefrom, one of said electromagnets being adapted for direct connection in bridge of the main circuit upon closure of a switch, means controlled by the electromagnets for causing the other electromagnets to become successively connected each in an independent branch of the main circuit, and additional electromagnetic controlling means adapted to successively open the electromagnet circuits in reverse order.

25. The combination with a main circuit, of a plurality of electromagnets normally disconnected therefrom, one of said electromagnets being adapted for direct connection in bridge of the main circuit upon closure of a switch, means controlled by the electromagnets for causing the other electromagnets to become successively connected each in an independent branch of the main circuit, additional electromagnetic controlling means adapted to successively open the electromagnet circuits in reverse order, and to eventually open the main circuit.

26. The combination with a main line, of a plurality of electromagnets having one terminal connected with one line limb and the other terminal normally disconnected from the other line limb, one of said electromagnets being adapted to have its other terminal connected directly with the other line limb upon closure of a switch, means upon actuation of the one electromagnet for causing the other terminal of the next electromagnet to be connected with the other line limb, means upon actuation of the second electromagnet for causing the other terminal of the third electromagnet to be connected with the other line limb and so on until all the electromagnets have been connected successively in bridge of the line limbs in a certain order, and additional mechanism adapted to successively disconnect the first terminal of the electromagnets of the first line in reverse order to the connection of the other terminals of the electromagnets with the other line limb.

27. The combination of a sectional rheostat, an electromagnetic switch for each section, means associated with each switch magnet except the last for bringing the succeeding magnet into operation upon the actuation of its own switch, and a master magnet for successively deënergizing the switch magnets when the starting current becomes excessive.

28. The combination with an electric motor, of a starting rheostat controlled by a plurality of successively energized magnets, each of the said magnets being arranged to bring its successor into operative excitation upon actuating its own rheostat switch, a master magnet connected in the motor circuit, and means associated with the master magnet for successively deënergizing the switch magnets when the current becomes excessive.

29. A plurality of electromagnets and a master electromagnet, combined with switches controlling the energizing circuits of the said electromagnets, said master magnet causing operation of the said switches in successive order when the current in the winding of the master magnet exceeds a predetermined value, and causing restoration of the switches as the current in the winding of the master magnet falls to its normal value.

In witness whereof, I hereunto subscribe my name this ninth day of April A. D., 1906.

DUGALD C. JACKSON.

Witnesses:
E. G. HOEFER,
DORA E. CASEY.